United States Patent [19]

Maltby

[11] 3,918,306
[45] Nov. 11, 1975

[54] SYSTEM FOR MEASURING FLUID LEVELS IN A VEHICLE TRANSMISSION

[75] Inventor: Frederick L. Maltby, Jenkintown, Pa.

[73] Assignee: Drexelbrook Controls, Inc., Glenside, Pa.

[22] Filed: Mar. 15, 1974

[21] Appl. No.: 451,407

[52] U.S. Cl. .............................. 73/304 C; 317/246
[51] Int. Cl.² ......................................... G01F 23/26
[58] Field of Search ............ 73/304 C, 118; 317/246, 317/247, DIG. 3; 340/59, 244 C; 324/61 P

[56] References Cited
UNITED STATES PATENTS

| | | | |
|---|---|---|---|
| 2,582,400 | 1/1952 | Smith | 73/304 C |
| 2,601,176 | 6/1952 | Smith | 73/304 C |
| 2,945,165 | 7/1960 | Franzel | 73/304 C X |
| 2,950,426 | 8/1960 | Frome | 73/304 C X |

*Primary Examiner*—Charles A. Ruehl
*Attorney, Agent, or Firm*—Woodcock, Washburn, Kurtz & Mackiewicz

[57] ABSTRACT

A system for measuring vehicle transmission fluid level includes a probe having a pair of electrodes attached to the transmission housing. The capacitance between the electrodes, which varies as a function of the transmission fluid level is connected into an impedance network. A detector which is coupled to the impedance network generates an output signal representing a change in the impedance of the network. In order to compensate for changes in transmission fluid level due to changes in temperature, the network includes a temperature-sensitive impedance.

15 Claims, 9 Drawing Figures

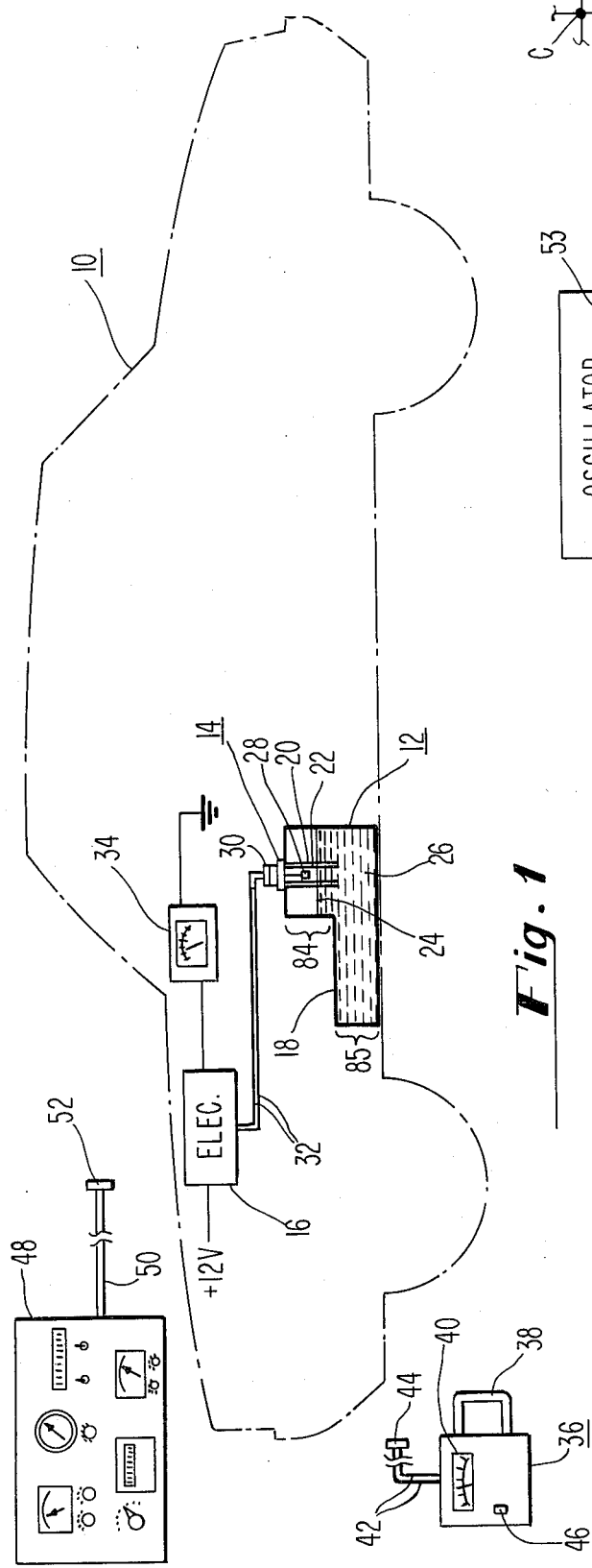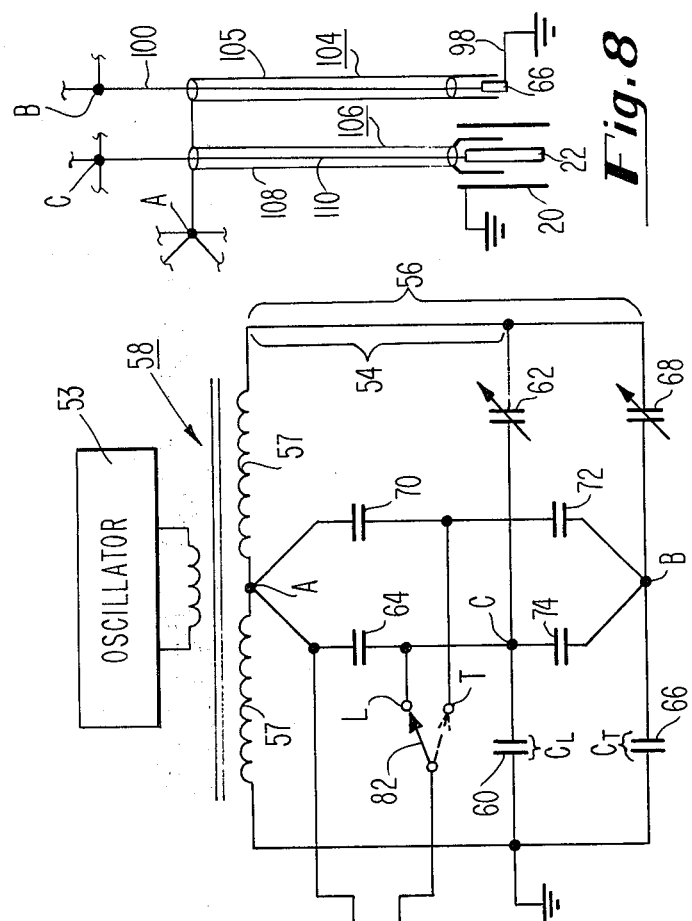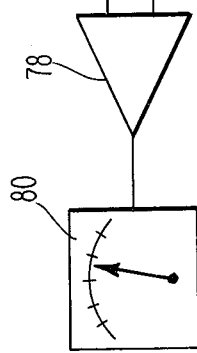

SYSTEM FOR MEASURING FLUID LEVELS IN A VEHICLE TRANSMISSION

BACKGROUND OF THE INVENTION

This invention relates to the measurement of fluid level in a vehicle transmission, and more particularly, to the measurement of the transmission fluid level utilizing an electronic probe.

The proper maintenance of a transmission in an automobile or other vehicle requires careful monitoring of the fluid level in the transmission housing. In general, the transmission fluid level is checked infrequently, at best, and this check is usually performed at the time of periodic maintenance on the vehicle. Typically, the check is performed by a mechanical measurement of the transmission fluid level which may accurately reflect the level of transmission fluid. However, this level varies greatly as a function of temperature within the transmission housing, and it is not therefore particularly accurate as to the amount of the transmission fluid within the housing. In addition to being somewhat inaccurate, measurement of transmission fluid level by mechanical means is rather inconvenient, and virtually impossible in the case of sealed transmission.

Probes for measuring the level of different types of material do exist in the prior art. For example, U.S. Pat. No. 3,706,980 — Maltby, assigned to the assignee of this invention, discloses a probe and a detection circuitry for determining the level of materials between two conductive members. By providing a guard shield in the probe which is driven at the same potential as one of the conductive surfaces, the probe and detection circuitry are relatively insensitive to temperature changes and do not compensate for changes in the level of the materials due to changes in temperature.

U.S. Pat. No. 3,443,220 — Spademan discloses temperature compensation utilizing a temperature-sensitive resistor in conjunction with a dielectric measuring system having a pair of probe electrodes. The patent does not however suggest a method or apparatus for temperature compensation of fluid level.

U.S. Pat. No. 3,428,890 — Peck et al. discloses a dieelectric sensing probe in one arm of a bridge wherein another arm includes a temperature compensating resistor. The probe is not adapted to sense the level of liquids. Moreover, the temperature-sensitive resistor is not adapted to compensate for changes in the material being sensed but rather for changes in the probe electrodes due to changes in temperature.

SUMMARY OF THE INVENTION

It is an object of this invention to provide an improved technique for measuring the level of fluids or liquids.

It is another more specific object of this invention to provide an improved apparatus for measuring the level of transmission fluid in a vehicle.

It is a still more specific object of this invention to measure the transmission fluid level independent of changes in temperature.

It is also a specific object of this invention to provide a simple and inexpensive apparatus for measuring the transmission fluid level independent of changes in temperature.

It is also a specific object of this invention to provide accurate measurement of transmission fluid levels regardless of vehicle inclination or tilt.

It is also an object of this invention to provide for the convenient measurement of transmission fluid levels.

It is a further object of this invention to provide for the continuous monitoring of transmission fluid levels.

It is a further object of this invention to provide for the continuous monitoring of fluid level or temperature and the periodic measurement of fluid level and temperature.

In accordance with one important aspect of the invention, a system for measuring vehicle transmission fluid levels comprises a pair of probe electrodes which are attached to housing of the transmission and extend through the uppermost surface of the transmission fluid such that the amount of fluid between the electrode varies with the level of the transmission fluid in the housing. Circuit means are coupled to the pair of probe electrodes so as to form an impedance network including the capacitance between the probe electrodes which varies as a function of the fluid level. Dectector means coupled to the circuit means generate an output signal representing a change in the impedance of the circuit means. The circuit means includes a temperature-sensitive impedance means attached to the housing so as to be in thermal communication with the transmission fluid. The temperature-sensitive impedance varies with the temperature as the ratio of transmission fluid volume to the area of the uppermost fluid surface such that the temperature-sensitive impedance compensates for changes in the level due to temperature changes. The output signal of the detector means therefore represents the level which the transmission fluid would attain at a fixed reference temperature.

In a particularly preferred embodiment of the invention, the circuit means and the capacitance between the probe electrode form a first bridge network and a second bridge network. The first bridge network has one arm on one side thereof comprising the capacitance between the probe electrodes, and the second bridge network has one arm on one side thereof comprising a portion of the temperature-sensitive impedance in direct thermal communication with the transmission fluid such that the one arm of the second bridge network has an impedance which varies with temperature. The circuit means further comprises a source of alternating voltage coupled to the first bridge network and the second bridge network. The circuit means may also comprise coupling circuitry connected to the source of voltage where the coupling circuitry forms the other side of the first bridge network and the other side of the second bridge network.

In accordance with another aspect of the invention, the detector means is selectively connected across the bridge networks so as to permit measurements of temperature compensated fluid levels or temperature. In measuring temperature compensated fluid levels, the detector means is connected across an impedance in the span of the first bridge network. In measuring temperature, the detector means is connected across an impedance in the span of the second bridge network.

In accordance with another important aspect of the invention, probe electrodes extend through the uppermost surface of the transmission fluid at an area substantially corresponding to the geometric center of the surface. By positioning the electrodes at this point, accurate measurement of fluid level may be obtained even though the vehicle is tilted.

In accordance with another aspect of the invention, a probe for measuring the level of transmission fluid comprises an outer conductive electrode extending above and below the uppermost surface of the transmission fluid, an inner conductive electrode extending above and below the surface of the transmission fluid where the inner conductive electrode is located centrally with respect to the outer conductive electrode. The inner and outer electrodes have a space therebetween along portions thereof for receiving the transmission fluid with solid insulation means separating the innner and outer electrodes above the fluid level. A conductive guard electrode is interposed in all possible leakage current paths through the solid insulation means between the inner conductive electrode means and the outer conductive means.

The probe may further comprise temperature compensation means in thermal communication with the transmission fluid. Additional solid insulation means separates the temperature compensation means and the inner conductive electrode means and an additional guard electrode is interposed in all possible current leakage paths through the solid insulation means between the temperature compensation means and the inner conductive electrode.

The outer electrode may include at least one opening for providing communication between the space above the uppermost surface of the transmission fluid outside the outer conductive electrode means and the space above the uppermost surface of the transmission fluid between the outer electrode and the inner electrode. The outer electrode and the inner electrode may also be flared outwardly and inwardly respectively at the lower ends thereof to assure that the fluid level between the electrodes is the same as that of the fluid in the housing.

BRIEF DESCRIPTION OF THE DRAWINGS

FIG. 1 illustrates an automobile with a system for monitoring the transmission fluid level in accordance with this invention;

FIG. 2 is a schematic diagram of transmission fluid level measuring circuitry in a preferred embodiment of the invention;

FIG. 8 is a schematic representation of the connection of the probe of FIG. 3 into the circuit of FIG. 2.

DETAILED DESCRIPTION OF PREFERRED EMBODIMENTS

Figure 3:
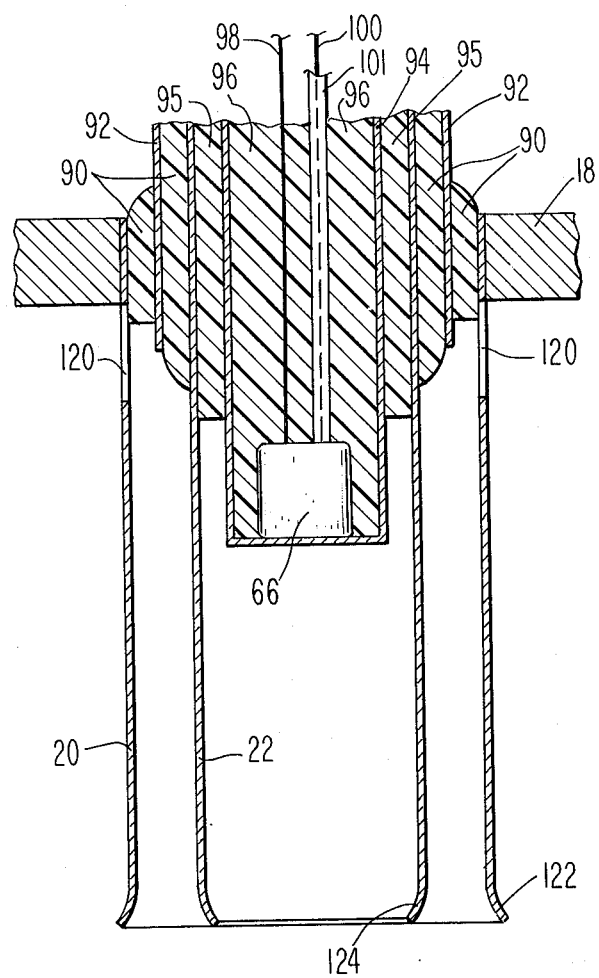
FIG. 3 is a sectional view of a transmission fluid level probe which extends into the transmission housing.

As shown in FIG. 1, a vehicle in the form of an automobile 10 having a transmission 12 is provided with a probe 14 and electronic circuitry 16 associated therewith for measuring the transmission fluid level within the housing 18 of the transmission 12. The probe 14 includes outer and inner, cylindrical concentric electrodes 20 and 22 which extend through the uppermost surface 24 of the transmission fluid 26 within the housing 18. As the level of the transmission fluid varies, the amount of transmission fluid in the space between the electrodes 20 and 22 will vary and this in turn will represent a detectable change in capacitance between the electrodes 20 and 22 which provides an indication of the transmission fluid level.

In accordance with one important aspect of the invention, the probe 14 also includes a temperature-sensitive impedance 28 which is in thermal communication with the transmission fluid 26 within the housing 18. The impedance 28 is connected to the circuitry 16 so as to compensate for changes in transmission fluid levels which are due to changes in temperature alone and not the actual amount of fluid within the housing 18.

As shown in FIG. 1, the probe 14 is connected to the circuitry 16 which is carried on board the automobile 10 through a plug 30 and leads 32. By utilizing the circuit 16 which is connected to a suitable gauge dial 34 on the automobile dashboard and the 12 volt vehicle battery, the driver of the automobile 10 is capable of continuously monitoring the transmission fluid level. As shown, the gauge dial 34 provides a reading of the exact level of the transmission fluid. As an alternative, the gauge 34 could be replaced with an alarm mechanism such as a flashing light which is activated when the transmission fluid falls below a predetermined safe level.

As shown in FIG. 1, it is also possible to connect the probe 14 to external circuitry for determining the transmission fluid level. A hand-held, battery-operated unit 36 having a handle 38 and a gauge dial 40 can be connected to the probe 14 through leads 42 and a plug 44 which may be inserted into the probe 14 when the plug 30 of the on-board gauge is removed. The dial 40 permits the actual level of the transmission fluid to be measured. The dial 40 may also be calibrated in degrees of temperature so as to permit the temperature within the transmission housing 18 to be read when a switch 46 is moved to the temperature reading position. The hand-held unit 36 is designed to be conveniently utilized by a mechanic servicing the automobile 10. The system of FIG. 1 also lends itself to use as a diagnostic tool in the factory or a computerized service center by providing a diagnostic unit 48 with leads 50 and a plug 52 identical to plugs 44 and 30.

The electronic circuitry in the on-board electronics 16, the hand-held unit 38 and the diagnostic unit 48 will now be described with reference to the schematic diagram of FIG. 2. The circuit comprises a fixed voltage oscillator 53 which serves as a source of alternating voltage for a first bridge network 54 and a second interconnected bridge network 56. The first and the second bridge networks include secondary windings 57 of a transformer 58 which couples the alternating voltage from the oscillator 53 into the bridge networks.

A capacitor 60 in one arm in the first bridge network 54 represents the capacitance $C_L$ between the probe electrodes 20 and 22 which is proportional to the actual level (uncompensated for temperature) of the transmission fluid. Another arm on the same side of the first bridge network 54 comprises a variable capacitor 62 which may be adjusted such that the first bridge network is balanced at a referenced level $L_R$. A capacitor 64 is connected in the span from the one side of the bridge comprising the capacitors 60 and 62 to the other side of the bridge comprising the secondary windings 57.

A temperature-sensitive capacitor 66 which is the temperature-sensitive impedance 28 shown in FIG. 1 and having a capacitance $C_T$ is connected into one arm on one side of the second bridge network 56. A variable capacitor 68 forms the outer arm on the same side of the bridge. By appropriately adjusting the capacitor 68, the second bridge network 56 may be balanced at a reference temperature $T_R$ so as to prevent the flow of current through capacitors 70 and 72 in the span from one side to the other side of the second bridge network 56.

In order to provide a temperature compensated level measurement, the first bridge network 54 is connected to the second bridge network 56 through a capacitor 74 connecting the one side of the first bridge network 54 to the one side of the second bridge network 56. By connecting a detector shown as a discriminator 76 across the span capacitor 64 of the first bridge network, a signal is detected, i.e., a voltage, which represents the level of the transmission fluid at a reference temperature. In other words, the voltage across the capacitor 64 does not vary with temperature but actually reflects the true level of the transmission fluid as if the temperature remained constant. The output of the discriminator 76 which is a DC voltage is applied to an amplifier 78 and this in turn is connected to a suitable meter or indicating device 80 which corresponds to the dial 34 on the dash of the vehicle, the dial 40 on the hand-held unit 36 or a meter on the diagnostic unit 48.

As mentioned earlier, the temperature compensated fluid level measurement is achieved by connecting the capacitor 64 across the input to the discriminator 76. This is accomplished by moving the switch 82 to position L as shown in FIG. 2. The temperature alone may be measured by moving the switch 82 to position T shown in broken lines such that the capacitor 70 of the second bridge network 56 is connected across the discriminator 76. The indicating device 80 may also be calibrated in terms of temperature, i.e., degrees so as to provide a temperature reading. This is particularly valuable to the driver and is preferred, over fluid level as an on-board indication of the condition of the transmission.

When the switch 82 is in the L position as shown, the current through the capacitor 64, due to the unbalance of the first bridge network 54 resulting from the effect of temperature changes on the capacitance $C_L$, is opposite in direction from current produced as a result of unbalance in the second bridge network 56 resulting for a change in capacitance $C_T$ of the temperature compensating capacitor 66. By properly choosing the capacitor 74, as well as the capacitors 70 and 72, current through the capacitor 64 will produce a voltage representing the level of the transmission fluid at the reference temperature. With the temperature compensating capacitor 66 in the position shown, the capacitor 66 must have a negative temperature coefficient such that the capacitance $C_T$ decreases with increasing temperature. Preferably, the capacitor 66 has a capacitance $C_T$ much larger than the total capacitance 60 between the electrodes of the probe, i.e., 5 to 10 times greater than that required to actually compensate for level changes.

The capacitors 70, 72 and 74 are then chosen so as to diminish the effect of this large change in capacitance with temperature.

When the switch 82 is in the T position, the voltage drop across the capacitor 70 indicates the temperature of the transmission fluid. Although this voltage will be somewhat affected by variations in the capacitance 60 between the electrodes of the probe, this effect on the temperature read is negligible.

Figure 4:
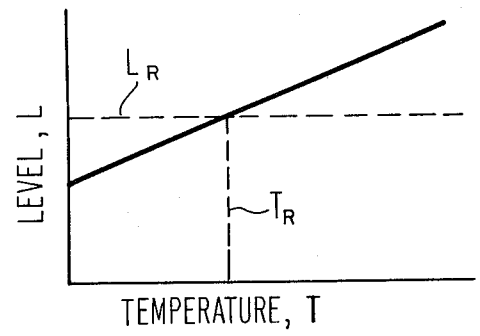
FIG. 4 is a graphic representation of the relationship between fluid level and temperature in a transmission.

FIG. 4 depicts the relationship between the level and temperature of the transmission fluid in a typical transmission housing. As shown, the level of the transmission fluid is substantially linearly related to the temperature of the fluid where the actual level $L = L_R + (T - T_R) S$ where $L_R$ is a reference level of transmission fluid at a reference temperature $T_R$ and the slope is proportional to the fluid volume divided by the oil surface area. In the transmission of FIG. 1, $S$ is proportional to the total volume of the transmission fluid 26 within the housing 18 divided by the total area of the uppermost surface 24.

Figure 5:
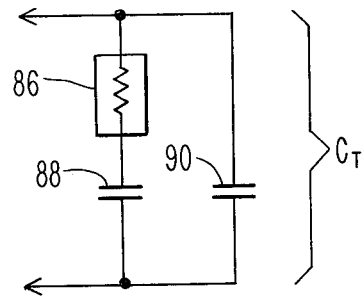
FIG. 5 is a temperature compensating network which may be utilized in the circuit of FIG. 2.

In some instances, the relationship between the level $L$ and the temperature $T$ may be non-linear where the walls in the upper chamber 84 above the lower chamber 85 are tapered or curved. A simple method of achieving non-linear temperature compensation involves the mere addition of a fixed capacitor in series with the capacitor 66. FIG. 5 depicts another method of achieving non-linear compensation where the temperature-sensitive impedance comprises a resistor 86 having a negative temperature coefficient in combination with a series capacitor 88. The series resistor-capacitor combination is then connected in parallel with a capacitor 90. By connecting this combination into the bridge circuitry of FIG. 2 in place of the capacitor 68 and substituting the capacitor 68 for the capacitor 66, a non-linear level temperature relationship can be achieved. It is important to note, however, that the temperature-sensitive impedance varies with temperature at a rate substantially proportional to the ratio of the transmission fluid volume divided by the area of the uppermost surface when utilizing a temperature-sensitive capacitor disclosed in FIG. 2 or the temperature-sensitive resistor-capacitor combination shown in FIG. 5.

Reference will now be made to the specific structure of the probe apparatus as shown in FIG. 3. The outer probe electrode 20 and the inner probe electrode 22 extend through an opening in the housing 18. The lower portions of the probe electrodes 20 and 22 are separated by a space receiving the transmission fluid while the upper portions of the electrodes 20 and 22 are separated by solid insulation 90. In addition, a guard electrode 92 which is driven at essentially the same potential as the ungrounded inner electrode 22 is interposed in every current leakage path through the solid insulation 90. By utilizing the guard electrode 92, leakage currents which would otherwise pass between the inner electrode 22 and the outer electrode 20 through the solid insulation 90 are eliminated. Elimination of these leakage currents are particularly important since leakage currents would vary with temperature and these variations would not be temperature compensated. Moreover, the use of the guard electrode 92 eliminates the criticality in the specific insulation 90 which is chosen. Accordingly, the mechanical strength in the chemical inertness of the insulation 90 need not be compromised for dielectric properties.

The temperature compensating capacitor 66 is located within a cup-like guard electrode 94. The electrode 94 is also driven at essentially the same potential as the ungrounded inner electrode 22 and thereby eliminates the current leakage through solid insulation 95 and 96. The capacitor 66 is connected into the second bridge network 56 shown in FIG. 2 by two leads. A first lead 98 which is connected to ground extends from the capacitor 66 through the solid insulation 96. The lead 98 is unshielded but the guard electrode 94 eliminates any current leakage through the insulation 96 from the grounded lead 98 to the inner electrode 22. A second lead 100 comprises the axial lead of a coaxial cable having a shield 101 driven at the same potential as the inner electrode 22. The shield 101 as well as the guard electrode 94 serve to prevent any leakage current between the grounded lead 98 and the ungrounded electrode 22 as well as the ungrounded lead 100 of the coaxial cable.

As shown in FIG. 3, the probe itself is immunized from the effects of stray capacitances and leakage currents from electrode to electrode and lead to lead. In addition, it is desirable to similarly immunize the wires or leads connecting the probe 14 to the circuitry 16 shown in FIG. 2. For this purpose, coaxial cables 104 and 106 are provided as shown in FIG. 8. The shield 105 of the cable 104, which is connected to the guard electrode 94 and the shield 101, is coupled to junction A of the secondary windings 57. The shielded axial lead 100 from the compensating capacitor 66 is connected to a terminal B of the capacitor 68 as shown in FIG. 2. Lead 98 as shown in FIG. 8 is depicted as connected to ground. Similarly, the shield 108 of the coaxial cable 106 is connected between the guard electrode 92 and terminal A. The shielded axial lead 110 within the coaxial cable 106 connects the inner electrode 22 to a terminal C of the capacitor 62. Although the temperature compensating capacitor 66 has been depicted as side-by-side with the outer and inner electrodes 20 and 22, it will be understood that this is merely for the purpose of clarity in the drawing. Preferably, the capacitor 66 is located centrally within the probe as shown in FIG. 3.

In accordance with another important aspect of the invention as shown in FIG. 3, the outer electrode 20 includes vent openings 120 adjacent the housing 18 and above the surface of the transmission fluid. The openings 120 will allow air pressure to assist the transmission fluid between the electrodes 20 and 22 to seek the same level as the transmission fluid outside the outer electrode 20. This same function can be provided by a screen-like or cage-like outer electrode 20. In addition, the ends 122 and 124 of the outer and inner electrodes 20 and 22 are flared outwardly and inwardly away from one another. The flared nature of the ends 122 and 124 prevents the transmission fluid from hanging up between the electrodes 20 and 22. This too assists in assuring that the transmission fluid between the electrodes 20 and 22 will seek the same level as the transmission fluid outside the outer electrodes 20.

Figure 6:
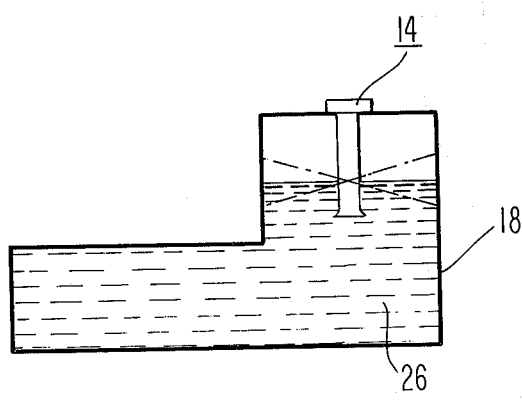
FIG. 6 is a sectional side view of a transmission housing with a probe for measuring fluid levels.
Figure 7:
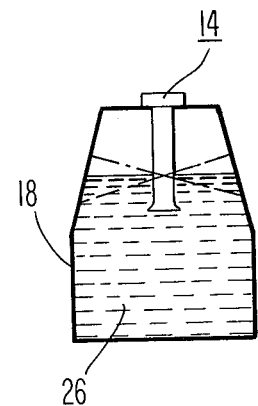
FIG. 7 is a sectional end view of the transmission housing of FIG. 6.

In accordance with another important aspect of the invention, the electrodes of the probe extend through the uppermost surface of the transmission fluid in an area substantially corresponding to the geometric center of the surface. As shown in the side view of FIG. 6, the probe 14 extends through the uppermost surface 24 at the midway point from front-to-back. In this position, tilting of the vehicle such that uppermost surface 24 assumes the position in dotted lines will not substantially affect the level measurement of the probe 14. Similarly, the probe 14 extends through the uppermost surface 24 at the midway point from side-to-side as shown in the end view of FIG. 7. Note that the walls at the sides of the transmission taper toward one another so as to require non-linear compensation as provided by the impedance of FIG. 5.

Figure 9:
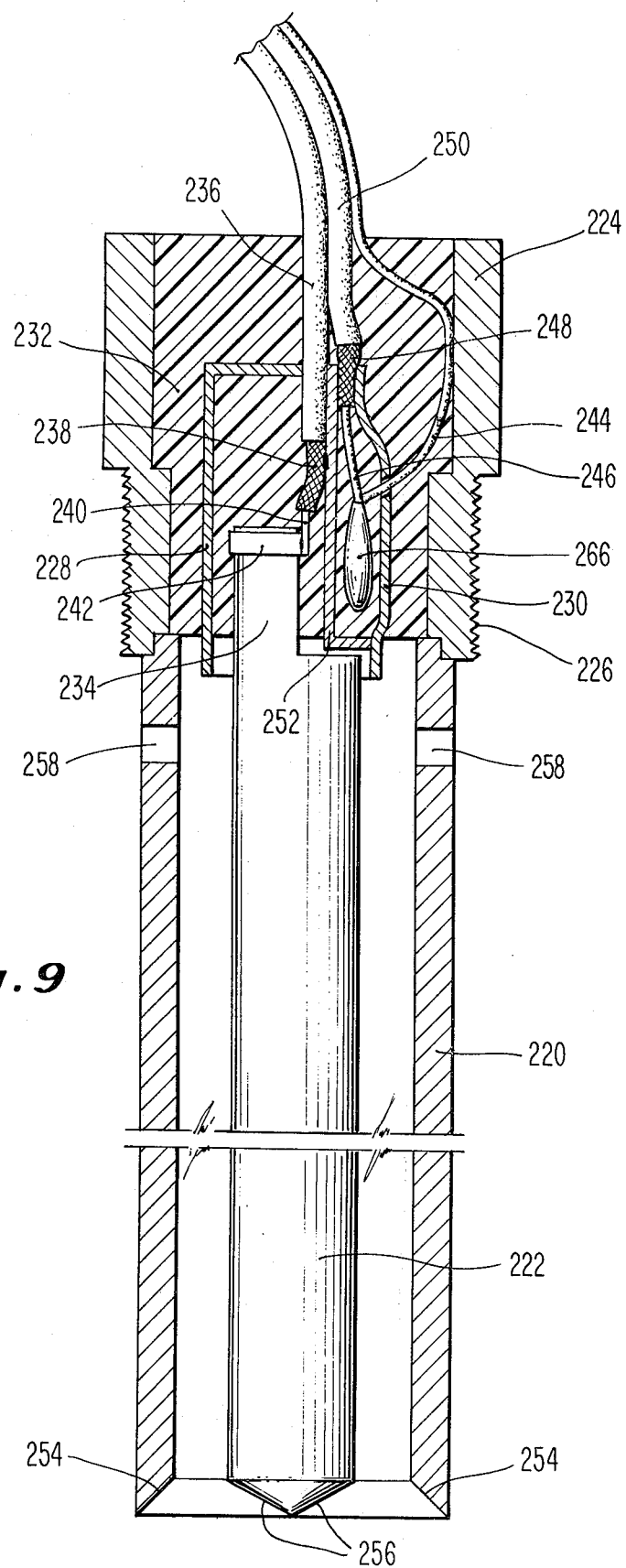
FIG. 9 is a sectional view of another probe which may be utilized in measuring vehicle transmission fluid levels.

FIG. 9 shows a particularly preferred probe 14 comprising an outer electrode 220 and an inner electrode 222. The outer electrode 220 is secured to a conductive mounting member 224 at the upper end thereof including a threaded portion 226 adapted to be received by the transmission housing. The interior of the mounting member 224 includes a driven, inverted cup-like guard shield 228 which bulges outwardly at side 230. The guard shield 228 extends completely through the solid insulation 232 so as to be interposed in any leakage current path through the solid insulation 232 from the outer electrode 220 through the mounting member 224 to the inner electrode 222 having an uppermost extension 234. Coaxial cable 236 which leads away from the extension 234 of the inner electrode 222 has a shield 238 which is driven at the same potential as the inner electrode 222. An axial lead 240 which is connected to the inner electrode 222 by suitable means such as a conductive band 242 is therefore isolated from the outer electrode 220 by the guard electrode 228 and the shield 238.

A temperature compensating capacitor 266 is mounted within the guard shield 228 adjacent the bulge 230. A ground lead 244 is taken immediately outside the guard electrode 228 and electrically connected to the grounded mounting member 224. Insulation surrounds the ground lead 224 from the capacitor 266 to the ground connection on the mounting member 224. The other lead 246 of the capacitor 266 which is also insulated extends through a shield 248 of a coaxial cable 250. The shield 248 as well as the shield 238, both of which are driven at essentially the potential of the inner electrode 222, are electrically connected to a conductive member 252 which is interposed in all current leakage paths between the capacitor 266 and the extension 234 of the electrode 222.

As in the embodiment of FIG. 3, the lowermost ends of the probe electrodes 220 and 222 are flared outwardly. Due to the thickness of the outer electrode 220 and the inner electrode 222, the flaring is achieved by providing two tapering surfaces 254 and 256. The upper ends of the electrodes 220 and 222 also include vents 258.

Although preferred embodiments of the invention have been shown and described and various modifications suggested, it will be understood that further embodiments and modifications of the invention fall within the true spirit and scope of the invention as set forth in the appended claims.

I claim:

1. A system for measuring automobile transmission fluid levels comprising:
    an automobile transmission including a transmission housing enclosing a transmission fluid;
    a pair of probe electrodes attached to said housing, said electrodes extending into said transmission fluid through the uppermost surface thereof such that the amount of fluid between said electrodes varies with the level of said transmission fluid in said housing;

circuit means coupled to said pair of probe electrodes so as to form an impedance network including the capacitance between said probe electrodes which varies as a function of the transmission fluid level; and detector means coupled to said circuit means for generating an output signal representing the change in the impedance network of said circuit means;

said circuit means including a temperature-sensitive impedance means attached to said housing so as to be in thermal communication with the transmission fluid therein, said temperature-sensitive impedance varying with temperature as the ratio of transmission fluid volume to the area of said uppermost surface, said temperature-sensitive impedance compensating for changes in level due to temperature changes such that said output signal from said detector means represents the level which the transmission fluid within said housing would attain at a fixed reference temperature.

2. The system of claim 1 wherein said circuit means comprises a source of alternating voltage and said impedance network comprises a bridge including one side and another side, said capacitance between said probe electrodes being located in one arm on said one side thereof, said detector means being connected to said bridge for detecting unbalance in said bridge due to changes in the level of said transmission fluid.

3. The system of claim 2 including first capacitance means in the span between said one side and said other side of said bridge, said detector means being connected across said first capacitance means, said temperature-sensitive impedance means being connected to said first capacitance means such that current flow in one direction through said first capacitance means resulting from a change in the level of said transmission level due to a change in temperature alone is substantially cancelled by current flow in an opposite direction through said first capacitance means due to said change in temperature.

4. The system of claim 1 wherein said circuit means and the capacitance between said probe electrodes form a first bridge network and a second bridge network, said first bridge network having one arm on one side thereof comprising the capacitance between said probe electrodes and said second bridge network having one arm on one side thereof comprising said temperature-sensitive impedance, said circuit means further comprising a source of alternating voltage coupled to said first bridge network and said second bridge network, said detector being coupled to said first bridge network and said second bridge network so as to measure the combined unbalance of said first bridge network and said second bridge network.

5. The system of claim 4 wherein said circuit means further comprises coupling circuitry connected to said source of alternating voltage, said coupling circuitry forming the other side of said first bridge network and the other side of said second bridge network.

6. The system of claim 5 wherein said circuit means further comprises a first capacitance means in the span from said one side to said other side of said first bridge network and a second capacitance means connecting said one side of said first bridge network to said one side of said second bridge network, current flow in one direction through said first capacitance means resulting from an increase in the level of transmission fluid due to an increase in temperature alone being substantially cancelled by current flow in the opposite direction from said second capacitance means.

7. The system of claim 6 wherein the change in capacitance of said one arm of said second bridge network for a given change in temperature is substantially greater than the change in capacitance between said probe electrodes due to said given change in temperature alone.

8. The system of claim 6 wherein said temperature-sensitive impedance comprises a negative temperature coefficient capacitor.

9. The system of claim 6 wherein said temperature-sensitive impedance comprises a resistor having a negative temperature coefficient, said one arm of said second bridge circuit comprising a series capacitance means in series with said resistor and a shunt capacitance means in parallel with the series combination of said resistor and said series capacitance.

10. The system of claim 6 wherein said temperature-sensitive impedance means of said circuit means further comprises third capacitance means in the span from said one side to said other side of said second bridge network, said system further comprises means for connecting said detector means across said third capacitance means so as to provide an output signal representing the temperature of said transmission fluid in said housing.

11. The system of claim 10 further comprising switch means for selectively connecting said detector means across said first capacitance means for measuring temperature compensated fluid levels or across said third capacitance means for measuring the temperature of said transmission fluid.

12. The system of claim 1 wherein said probe electrodes extend through the uppermost surface of said transmission fluid at an area substantially corresponding to the geometric center of said surface.

13. In a vehicle comprising a transmission including a transmission housing having transmission fluid therein, the improvement comprising a probe for measuring the level of transmission fluid in the transmission housing comprising:

outer conductive electrode means extending above and below the uppermost surface of the transmission fluid;

inner conductive electrode means extending above and below said surface of the transmission fluid, said inner conductive electrode means being located centrally with respect to said outer conductive electrode means;

said inner and outer electrode means having a space therebetween along portions thereof for receiving said transmission fluid;

solid insulation means separating said inner conductive electrode means and said outer conductive electrode means along other portions thereof;

a conductive guard electrode interposed in all possible current leakage paths through said solid insulation means between said inner conductive electrode means and said outer conductive electrode means;

temperature compensation impedance means in thermal communication with the transmission fluid in said housing;

additional solid insulation means separating said temperature compensation impedance means and said inner conductive electrode means; and an additional guard electrode interposed in all possible current leakage paths through said additional solid insulation means between said temperature compensation impedance means and said inner conductive electrode means.

14. In a vehicle comprising a transmission including a transmission housing having transmission fluid therein, the improvement comprising a probe for measuring the level of transmission fluid in the transmission housing comprising:

outer conductive electrode means extending above and below the uppermost surface of the transmission fluid;

inner conductive electrode means extending above and below said surface of the transmission fluid, said inner conductive electrode means being located centrally with respect to said outer conductive electrode means;

said inner and outer electrode means having a space therebetween along portions thereof for receiving said transmission liquid;

solid insulation means separating said inner conductive electrode means and said outer conductive electrode means along other portions thereof; and a conductive guard electrode interposed in all possible current leakage paths through said solid insulation means between said inner conductive electrode means and said outer conductive electrode means;

said outer conductive electrode means and said inner conductive electrode means of said probe apparatus being flared outwardly and inwardly respectively at the lower ends thereof.

15. In a vehicle comprising a transmission including a transmission housing having transmission fluid therein, the improvement comprising a probe for measuring the level of transmission fluid in the transmission housing comprising:

outer conductive electrode means extending above and below the uppermost surface of the transmission fluid;

inner conductive electrode means extending above and below said surface of the transmission fluid, said inner conductive electrode means being located centrally with respect to said outer conductive electrode means;

said inner and outer electrode means having a space therebetween along portions thereof for receiving said transmission liquid;

solid insulation means separating said inner conductive electrode means and said outer conductive electrode means along other portions thereof;

a conductive guard electrode interposed in all possible current leakage paths through said solid insulation means between said inner conductive electrode means and said outer conductive electrode means; and means for driving said guard electrode at substantially the same potential as said inner conductive electrode means.

* * * * *